US012725163B2

(12) United States Patent
Wieker et al.

(10) Patent No.: US 12,725,163 B2
(45) Date of Patent: Sep. 1, 2026

(54) DYNAMIC IDENTITY PROOFING

(71) Applicant: Capital One Services, LLC, McLean, VA (US)

(72) Inventors: Jeffrey Carlyle Wieker, Falls Church, VA (US); Tariq Delwar, Naperville, IL (US)

(73) Assignee: Capital One Services, LLC, McLean, VA (US)

( * ) Notice: Subject to any disclaimer, the term of this patent is extended or adjusted under 35 U.S.C. 154(b) by 24 days.

(21) Appl. No.: 18/584,066

(22) Filed: Feb. 22, 2024

(65) Prior Publication Data

US 2025/0272686 A1 Aug. 28, 2025

(51) Int. Cl.
*G06Q 20/40* (2012.01)
*G06Q 20/34* (2012.01)

(52) U.S. Cl.
CPC ......... *G06Q 20/4016* (2013.01); *G06Q 20/34* (2013.01)

(58) Field of Classification Search
CPC ............... G06Q 20/4016; G06Q 30/06; G06Q 20/4018; G06Q 20/34; G06Q 20/40; G06Q 20/382
See application file for complete search history.

(56) References Cited

U.S. PATENT DOCUMENTS

| | | | | |
|---|---|---|---|---|
| 9,444,824 | B1 | 9/2016 | Balazs et al. | |
| 11,205,179 | B1 * | 12/2021 | Patel | G06Q 20/4016 |
| 11,544,577 | B1 | 1/2023 | Nookula et al. | |
| 2016/0342997 | A1 * | 11/2016 | De Tella | G06Q 20/382 |
| 2018/0060867 | A1 * | 3/2018 | Hagan | G06Q 20/34 |
| 2018/0181956 | A1 * | 6/2018 | Zarakas | G06Q 20/325 |
| 2019/0164163 | A1 * | 5/2019 | Skordas | G06Q 50/265 |
| 2021/0185076 | A1 * | 6/2021 | Miller | H04L 63/107 |
| 2022/0414347 | A1 | 12/2022 | Levy et al. | |
| 2023/0097083 | A1 | 3/2023 | Perreault et al. | |
| 2023/0169263 | A1 | 6/2023 | Jose et al. | |
| 2024/0020700 | A1 * | 1/2024 | Pianta | G06F 18/214 |
| 2025/0225379 | A1 * | 7/2025 | Zhang | G06N 3/0499 |

* cited by examiner

*Primary Examiner* — Hao Fu

(74) *Attorney, Agent, or Firm* — Banner & Witcoff, Ltd.

(57) ABSTRACT

Systems as described herein may implement a mechanism for dynamic identity proofing. A dynamic identity proofing system may receive first user input information and browser information from a user device conducting a transaction with an interaction entity. The system may determine a risk score indicating a likelihood the transaction is fraudulent. Based on the risk score exceeding a threshold value, the system may use a machine learning model to determine confirmative information to lower the risk score. The system may cause display of one or more web elements on the checkout page prompting for the confirmative information. The system may determine an updated risk score based on second user input information responsive to the confirmative information. Accordingly, if the updated risk score does not exceed the threshold value, the system may cause the checkout page to be automatically populated with additional secure information.

20 Claims, 8 Drawing Sheets

DYNAMIC IDENTITY PROOFING

FIELD OF USE

Aspects of the disclosure relate generally to big data and more specifically to the processing of big data to facilitate identity proofing.

BACKGROUND

A remote server in a computing network may process data, including user browser data generated from user devices, to facilitate decision-making process. For example, a user may interact with a browser, a browser extension or other mechanisms installed on a user device to access information on certain websites related to an interaction entity (e.g., a merchant) providing a service or a product. In certain conventional systems, the user may face the tedious tasks of manually entering information to each field of a guest checkout page, negatively impacting their experience. Alternatively, other conventional systems may automatically fill these fields with known user information, incurring a risk of exposing sensitive user data to potential imposters. As a result, conventional system may fail to strike a balance between enhancing data security while providing an optimal user experience, and thereby limit its ability to utilize and process user interaction data in real time and offer insights to support the identity proofing process.

Aspects described herein may address these and other problems, and generally improve the security, efficiency, and speed of processing user interaction data to facilitate dynamic identity proofing.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Systems as described herein may include features for dynamic identity proofing. A dynamic identity proofing system may receive first user input information from a checkout page associated with an interaction entity (e.g., a merchant) and browser information associated with a user device conducting a transaction with the interaction entity via the checkout page. For example, the first user input information may include an identifier of a payment card, and the browser information may include an address of the user device. The system may use a browser extension or other mechanisms (e.g., Application Programming Interfaces (APIs), cookies, front end or server end code, integrations with Content Management System (CMS), applications on ecommerce platforms) on the user device to collect the browser information. The system may determine a risk score indicating a likelihood the transaction is fraudulent. If the risk score exceeds a threshold value, the system may provide, as input to a machine learning model, known characteristics of the user device conducting the transaction. The known characteristics may include the risk score, the first user input information and the browser information, and the like. Based on output from the machine learning model, the system may determine confirmative information associated with the known characteristics to lower the risk score. The system may cause, on the user device, display of one or more web elements on the checkout page prompting for the confirmative information. The system may receive, from the user device, second user input information associated with the one or more web elements. Based on the second user input information, the system may determine an updated risk score associated with the transaction. If the updated risk score does not exceed the threshold value, the system may cause the checkout page to be automatically populated with additional secure information associated with the user device. The confirmative information or the additional secure information may include at least one of a billing address, a shipping address, an email address, a phone number, a name associated with a user of the user device, or the like. The confirmative information and the additional secure information may be generated dynamically and the web elements prompting for the confirmative information may be displayed dynamically on the checkout page. For example, for a first user conducting a first transaction, the confirmative information may include a billing address of the user, and the additional secure information may include an email address of the user. For a second user conducting a second transaction, the confirmative information may include a phone number of the user, and the additional secure information may include a shipping address of the user.

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

Figure 1:
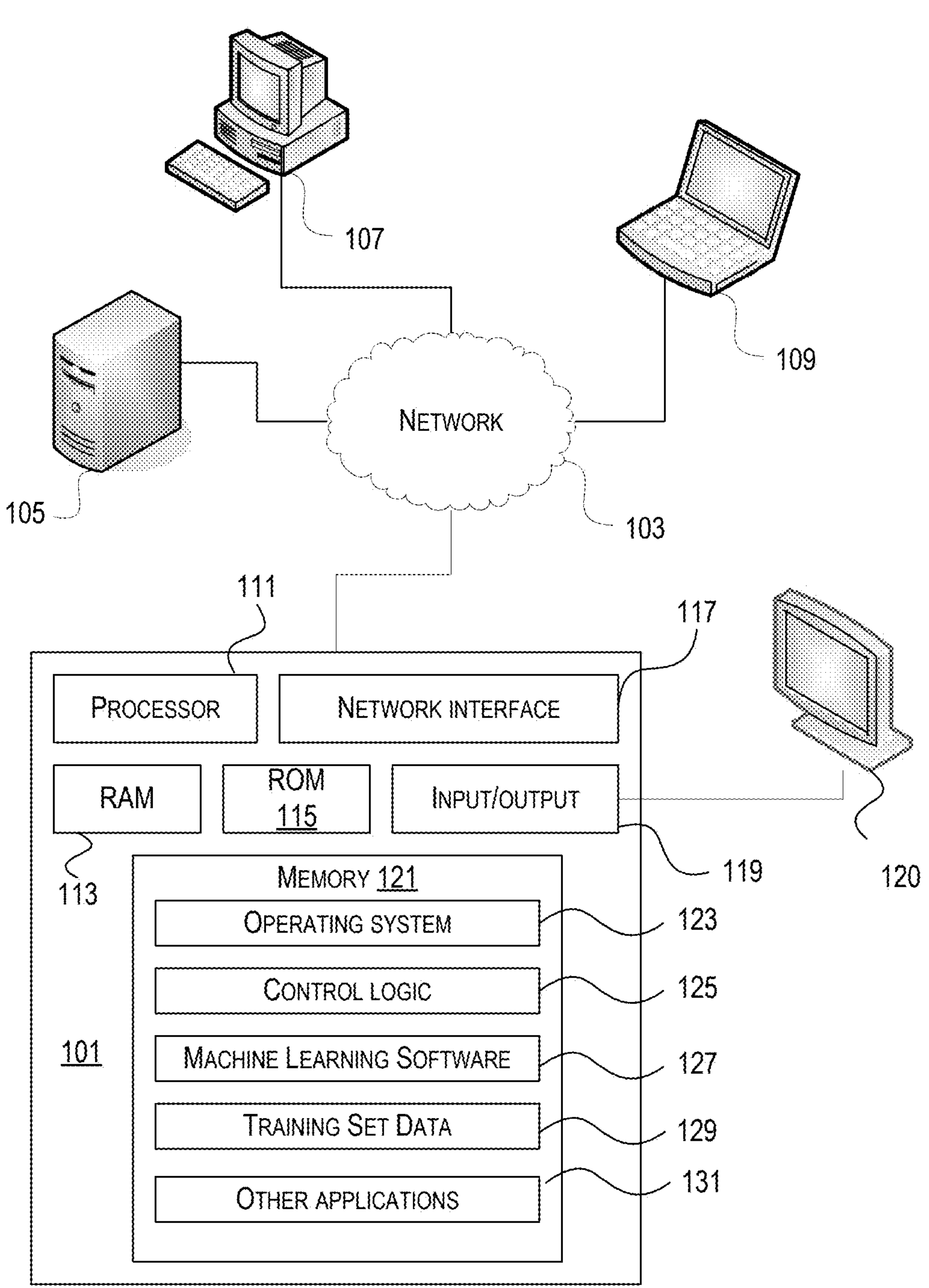
FIG. 1 depicts an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects described herein may relate to dynamic identity proofing. A dynamic identity proofing system may receive first user input information (e.g., an identifier of a payment card) from a checkout page on a website associated with an entity, and browser information (e.g., an address) associated with the user device conducting a transaction with the entity via the checkout page. For example, the system may use a browser extension or other mechanisms (e.g., Application Programming Interfaces (APIs), cookies, front end or server end code, integrations with Content Management System (CMS), applications on ecommerce platforms) on the user device to collect the browser information. The system may determine a risk score indicating a likelihood that the transaction is fraudulent. If the risk score exceeds a threshold value, the system may provide, as input to a machine learning model, known characteristics of the user device conducting the transaction. The known characteristics may include the risk score, the first user input information and the browser information, and the like. Based on output from the machine learning model, the system may determine confirmative information associated with the known characteristics to lower the risk score. The system may cause, on the user device, display of one or more web elements on the checkout page prompting for the confirmative information. For example, the system may cause the user device to display a prompt asking for a billing address of the user. The system may receive, from the user device, second user input information associated with the one or more web elements. Based on the second user input information, the system may determine an updated risk score associated with the transaction. If the updated risk score does not exceed the threshold value, the system may cause the checkout page to be automatically populated with additional secure information associated with the user device. For example, the system may cause the checkout page to be automatically populated with a shipping address, an email address and a phone number of the user.

In many aspects, prior to causing the checkout page to be automatically populated, the system may, retrieve, based on the identifier of the payment card and from a database, the additional secure information associated with the user device. The additional secure information may correspond to one or more unfilled web elements of the checkout page. The confirmative information or the additional secure information may include at least one of a billing address, a shipping address, an email address, a phone number, a name associated with a user of the user device, or the like.

In many aspects, the browser information may further include device information such as an IP address of the user device, a type of browser that the user device displays the checkout page, and a make or a model of the user device. The browser information may further include transaction information such as a timestamp, a price and one or more products associated with the transaction. The browser information may further include entity information such as an entity name, a merchant category code (MCC) associated with the entity and a product or service provided by the entity.

In many aspects, the system may train the machine learning model to determine the confirmative information based on training data including pre-labeled risk scores for training transactions, device information associated with training user devices conducting the training transactions, transaction information associated with one or more products in the training transactions, and merchant information associated with the training transactions. The system may determine the risk score by providing, as input to a second machine learning model, the first user input information and the browser information. The system may determine, based on output from the second machine learning model, the risk score. In some examples, the checkout page may be associated with a guest checkout page.

The dynamic identity proofing system may differ from conventional data processing systems at least because it captures and processes information on user interaction with a website captured from the browser extension or other mechanisms. The present system is significantly more than merely randomly collecting user interaction information: rather, the present system may analyze the user interaction information and browser information to determine confirmative information that might lower transaction risks. The present system may use one or more machine learning models to determine a risk score indicating a likelihood that the transaction is fraudulent and dynamically prompt for the confirmative information on the website to further reduce the risk score.

Aspects described herein improve the functioning of computers by improving the accuracy, relevancy and performance of computer-implemented authentication processes. The steps described herein recite improvements to computer-implemented identity proofing processes, and in particular improve the accuracy and utility of user interaction information with website elements. This is a problem specific to computer-implemented identity proofing processes, and the processes described herein could not be performed in the human mind (and/or, e.g., with pen and paper). For example, as will be described in further detail below, the processes described herein rely on the use of browser extension and websites, the processing of user interaction information with the website elements, and the use of various machine learning models.

Before discussing these concepts in greater detail, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, computing devices 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, and training set data 129. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, computing devices 101, 105, 107, 109, and others may operate in concert to provide parallel computing features in support of the operation of control logic 125 and/or machine learning software 127.

Figure 2:
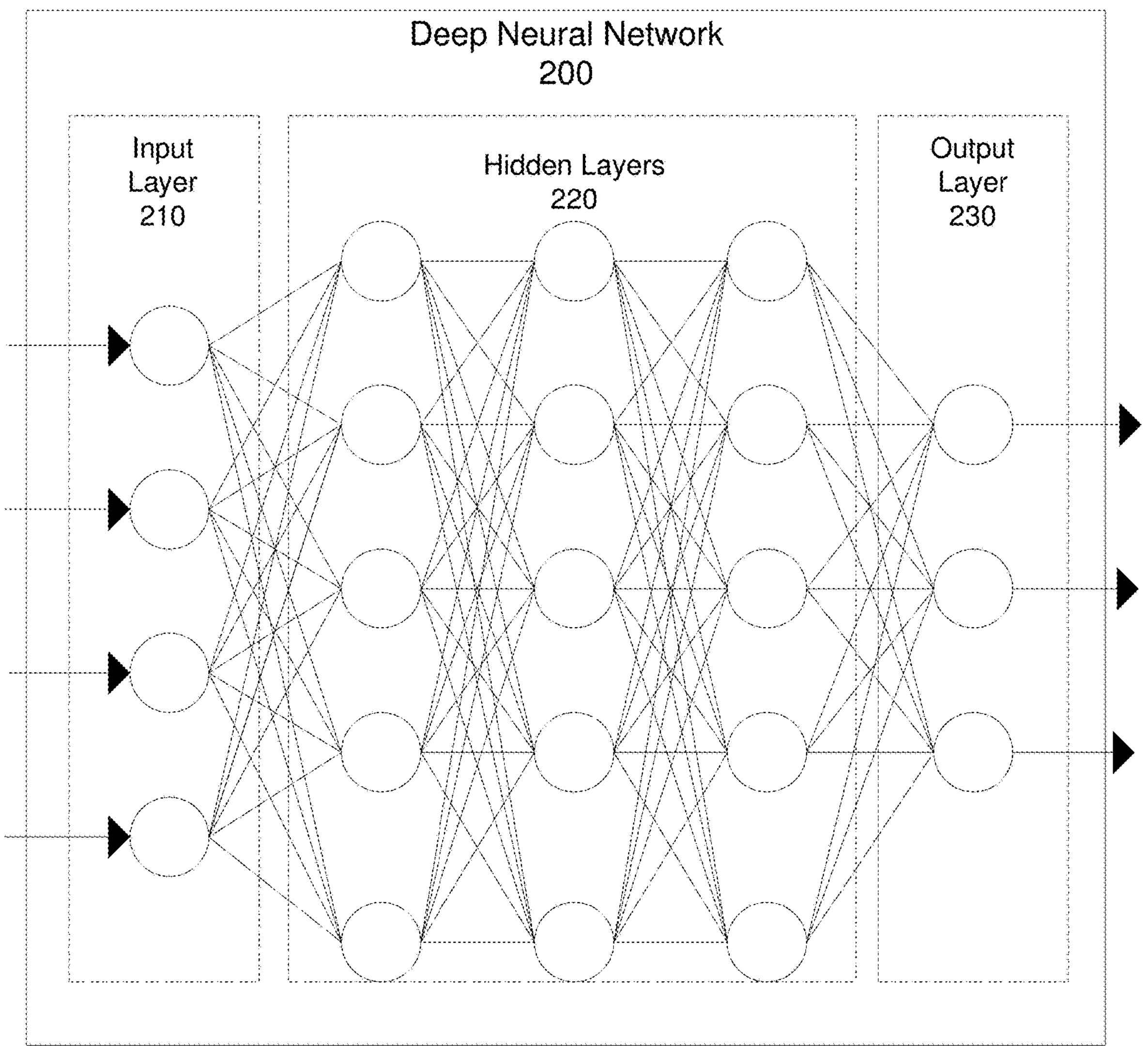
FIG. 2 depicts an example of deep neural network architecture for a model according to one or more aspects of the disclosure.

FIG. 2 illustrates an example deep neural network architecture 200. Such a deep neural network architecture might be all or portions of the machine learning software 127 shown in FIG. 1. That said, the architecture depicted in FIG. 2 need not be performed on a single computing device, and might be performed by, e.g., a plurality of computers (e.g., one or more of the devices 101, 105, 107, 109). An artificial neural network may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training set and used to generate predictions regarding the likely results. Artificial neural networks may have many applications, including object classification, image recognition, speech recognition, natural language processing, text recognition, regression analysis, behavior modeling, and others.

An artificial neural network may have an input layer 210, one or more hidden layers 220, and an output layer 230. A deep neural network, as used herein, may be an artificial network that has more than one hidden layer. Illustrated network architecture 200 is depicted with three hidden layers, and thus may be considered a deep neural network. The number of hidden layers employed in deep neural network 200 may vary based on the particular application and/or problem domain. For example, a network model used for image recognition may have a different number of hidden layers than a network used for speech recognition. Similarly, the number of input and/or output nodes may vary based on the application. Many types of deep neural networks are used in practice, such as convolutional neural networks, recurrent neural networks, feed forward neural networks, combinations thereof, and others.

During the model training process, the weights of each connection and/or node may be adjusted in a learning process as the model adapts to generate more accurate predictions on a training set. The weights assigned to each connection and/or node may be referred to as the model parameters. The model may be initialized with a random or white noise set of initial model parameters. The model parameters may then be iteratively adjusted using, for example, stochastic gradient descent algorithms that seek to minimize errors in the model.

Figure 3:
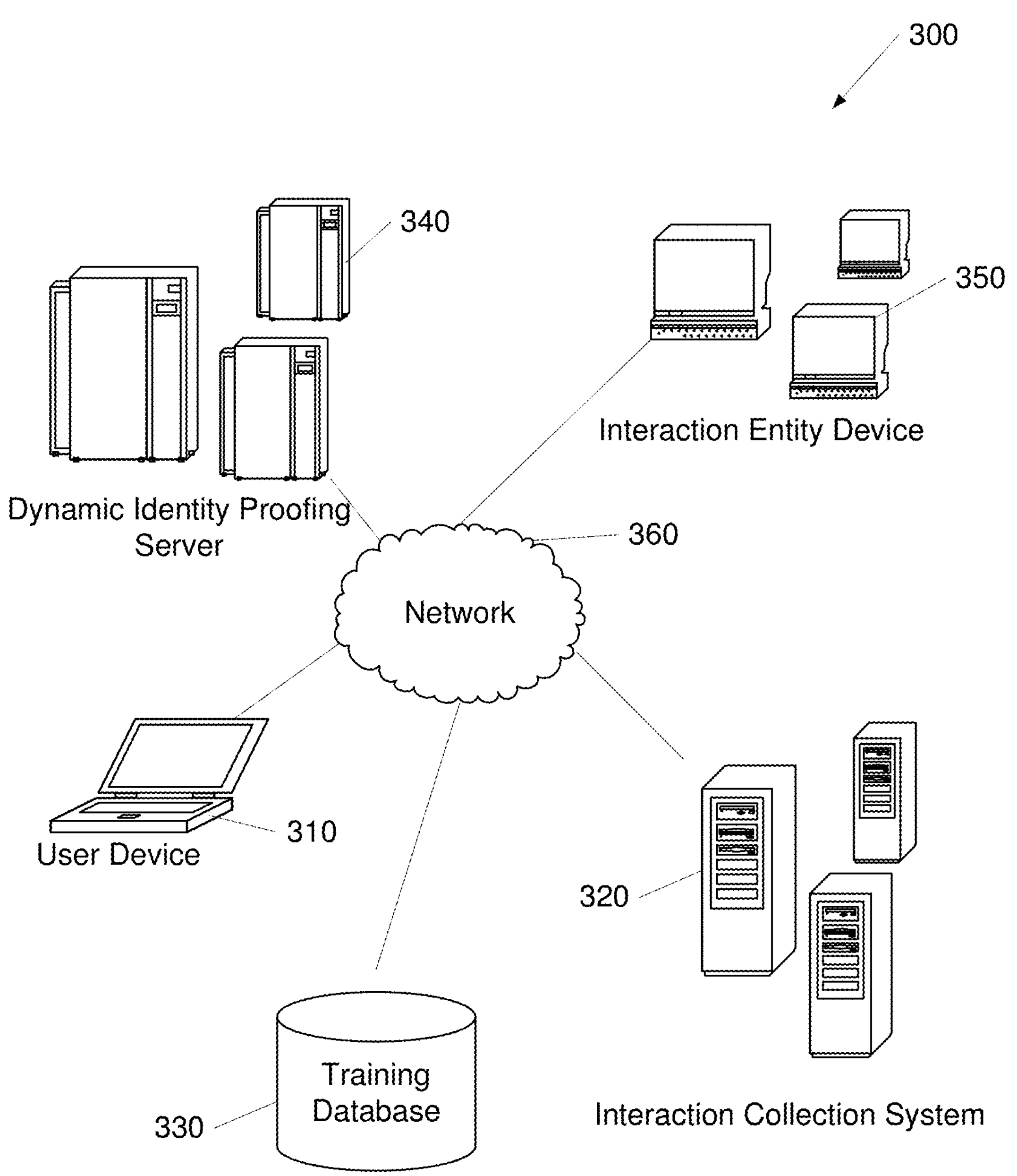
FIG. 3 shows an example of a system for dynamic identity proofing in which one or more aspects described herein may be implemented.

FIG. 3 depicts a system 300 for dynamic identity proofing. The dynamic identity proofing system 300 may include at least one user device 310, at least one interaction collection system 320, at least one training database 330, at least one dynamic identity proofing server 340, and/or at least one interaction entity device 350 in communication via a network 360. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 1.

User devices 310 may execute a browser extension and use the browser extension to monitor user interaction with various website elements. User devices 310 may also use other mechanisms (e.g., Application Programming Interfaces (APIs), cookies, front end or server end code, integrations with Content Management System (CMS), applications on ecommerce platforms) to monitor user interaction with various website elements. The website elements may correspond to one or more fields on a checkout page related to one or more products or services provided by the website. User device 310 may send user interaction information (e.g., user input information) and browser information, receive web elements prompting for confirmative information, and/or additional secure information to automatically populate certain fields on the checkout page.

Interaction collection system 320 may collect, parse, and/or store user input information on checkout pages related to various webpages that provide service or products by interaction entities (e.g., merchant devices or service provider devices) as described herein. Interaction collection system 320 may also collect, parse, and/or store browser information on user devices that interact with the websites. For example, the user input information may include an identifier of a payment card that a user uses to make a purchase for a product on the website. The user input information may include other information that uniquely identifies the user, such as an account number, an email address or a phone number. The browser information may include device information such as an address of the user device including an IP address, a type of browser on the user device displaying the checkout page, and a make or a model of the user device. Alternatively and/or additionally, the browser information may include transaction information such as a timestamp, a price and one or more products associated with the transaction. The transaction information may include historical transaction records of the user and other users. Alternatively and/or additionally, the browser information may include entity information such as an entity name, a MCC associated with the interaction entity and a product or service provided by the interaction entity. Interaction collection system 320 may track and store the user input information and browser information that may be related to an identity of the user and the corresponding user device.

Training database 330 may receive, store and provide training data to train different machine learning models. Training database 330 may store a first set of training data to train one or more machine learning models to determine risk scores for training transactions. The first set of training data may include pre-labeled risk scores for the training transactions, device information associated with training user devices conducting the training transactions, transaction information associated with one or more products in the training transactions, and merchant information associated with the training transactions. Training database 330 may store a second set of training data to train one or more machine learning models to determine confirmative information to lower risk scores for training users. The second set of training data may include pre-labeled risk scores for training transactions, user input information from the training users and browser information.

Dynamic identity proofing server 340 may receive first user input information and browser information from a browser extension or other mechanisms installed on user device 310. The user input information may include an identifier of a payment card that the user entered on a checkout page to purchase a product or service from a website. For example, rather than logging into the website as an account holder, the user may attempt to make a purchase via a guest checkout page. In this situation, dynamic identity proofing server 340 may have limited information on the identity of the guest user other than the identifier of the payment card. Dynamic identity proofing server 340 may use browser information collected by the browser extension installed on the user device to obtain known characteristics of the user device. The browser information may include information related to a user device that the user used on a checkout page, transaction information related to the product or service being purchased, or merchant information that provides the product or service via the website. Based on the user input information and the browser information, dynamic identity proofing server 340 may determine a risk score indicating a likelihood the transaction is fraudulent.

Dynamic identity proofing server 340 may determine whether the risk score exceeds a threshold value. If the risk score does not exceed the threshold value, dynamic identity proofing server 340 may automatically populate one or more fields on the checkout page and allow the transaction to proceed. Alternatively, when a user is checked out as a guest user, dynamic identity proofing server 340 may have limited information on the identity of the user, and the risk score for the transaction may exceed the threshold value. In this situation, dynamic identity proofing server 340 may request confirmative information from the user before the transaction is allowed to proceed. Dynamic identity proofing server 340 may use a machine learning model to determine what confirmative information to be requested from the user. For example, dynamic identity proofing server 340 may input the known characteristics of the user device conducting the transaction to the machine learning model. The known characteristics may include the risk score associated with the transaction being processed, the first user input information and the browser information. Based on output from the machine learning model, dynamic identity proofing server 340 may determine confirmative information to be requested from the user to verify the user's identity and further reduce the risk score of the transaction.

Dynamic identity proofing server 340 may cause one or more web elements, which may correspond to one or more fields on a web form, to be displayed on the user device to prompt for such confirmative information. The confirmative information may include a billing address, a shipping address, an email address, a phone number, or a name of the user, which may be used to further verify the identity of the user. The web elements may be generated dynamically based on the risk score. For example, in a situation that a first transaction and a second transaction both have their risk scores exceeding the threshold value, if a first transaction has a risk score relatively lower than that of a second transaction, dynamic identity proofing server 340 may request less confirmative information from a first user conducting the first transaction than a second user conducting the second transaction. For example, dynamic identity proofing server 340 may request the first user to provide only her billing address for the payment card, while dynamic identity proofing server 340 may request the second user to provide both the billing address and an email address. Dynamic identity proofing server 340 may request the user to provide confirmative information that is not easily guessable based on known characteristics of the user device, or transaction-based questions generated using the user's past transaction history. The confirmative information may be associated with different difficulty levels. Dynamic identity proofing server 340 may request confirmative information with a higher difficulty level (e.g., more difficult to guess) from the second user than that from the first user. As such, the confirmative information and the corresponding web elements may be dynamically generated and displayed to the user based on the corresponding risk scores of the transactions.

Dynamic identity proofing server 340 may receive, from the user device, second user input information associated with the one or more web elements. Based on the second user input information, dynamic identity proofing server 340 may determine an updated risk score associated with the transaction.

If the updated risk score does not exceed the threshold value, dynamic identity proofing server 340 may cause the checkout page to be automatically populated with additional secure information associated with the user or the user device. The additional secure information may include user information such as a billing address, a shipping address, an email address, a phone number, or a name associated with the user of the user device. For example, dynamic identity proofing server 340 may cause any unfilled field on the checkout page to be automatically populated.

Alternatively, if the updated risk score still exceeds the threshold value, dynamic identity proofing server 340 may either terminate the transaction or go through another round of iteration. In the next iteration, dynamic identity proofing server 340 may input the updated risk score, the first and second user input and the browser information to the machine learning model and receive, from the machine learning model, additional confirmative information to be requested from the user. Dynamic identity proofing server 340 may go through several iterations until it determines that the risk score does not exceed the threshold value.

Dynamic identity proofing server 340 may use another machine learning model to determine the risk score associated with the transaction. Dynamic identity proofing server 340 may provide the first user input and browser information to the machine learning model, and receive the risk score as an output from the machine learning model. The first input may include the identifier for the payment card. Dynamic identity proofing server 340 may provide the first user input, second user input and browser information to the machine learning model, and receive the updated risk score as an output from the machine learning model. The second user input may include user response to the confirmative information.

Interaction entity device 350 may be a device that hosts a website that provides a product or a service to the users. Interaction entity device 350 may be associated with entity information such as an entity name, a MCC, a location, a product or service provided by the entity. The entity information may be collected as part of the browser information. The entity information may be used as input to the machine learning model to determine the confirmative information to be requested from the user to further verity the identity of the user. Such entity information may also be used as input to another machine learning model to determine the risk score or updated risk score of the transaction. In some examples, the entity information and other browser-related information may be collected as browser information by the browser extension or other mechanisms installed on the user device and send to dynamic identity proofing server 340. In other examples, the entity information and other browser information may be provided by interaction entity device 350. Interaction entity device 350 may send the entity information and other browser information to dynamic identity proofing server 340 in the form of International Organization for Standardization (ISO) 20022 pre-authentication message. The pre-authentication message may use an ISO standard format for electronic data interchange between computing devices including dynamic identity proofing server 340 and interaction entity device 350. The ISO 20022 standard may describe a metadata repository containing descriptions of messages and processes related to a transaction, and a maintenance process for the repository content. The standard may cover financial information transferred between computing devices that includes payment transactions, securities trading and settlement information, credit and debit card transactions and other financial information. In some examples, the entity information communicated between interaction entity device 350 and dynamic identity proofing server 340 may using XML schema for more robust data exchange to support dynamic identity proofing.

User device 310, interaction collection system 320, training database 330, dynamic identity proofing server 340, and/or interaction entity device 350 may be associated with a particular authentication session. Dynamic identity proofing server 340 may receive user input information and browser information, process the user input information and browser information, and/or confirmative information and additional secure information with user devices or interaction entity devices as described herein. However, it should be noted that any device in the dynamic identity proofing system 300 may perform any of the processes and/or store any data as described herein. Some or all of the data described herein may be stored using one or more databases. Databases may include, but are not limited to, relational databases, hierarchical databases, distributed databases, in-memory databases, flat file databases, XML databases, NoSQL databases, graph databases, and/or a combination thereof. The network 360 may include a local area network (LAN), a wide area network (WAN), a wireless telecommunications network, and/or any other communication network or combination thereof.

The data transferred to and from various computing devices in dynamic identity proofing system 300 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. A file-based integration scheme or a service-based integration scheme may be utilized for transmitting data between the various computing devices. Data may be transmitted using various network communication protocols. Secure data transmission protocols and/or encryption may be used in file transfers to protect the integrity of the data such as, but not limited to, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the dynamic identity proofing system 300. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. Secure network appliances may include built-in features such as hardware-accelerated SSL and HTTPS, WS-Security, and/or firewalls. Such specialized hardware may be installed and configured in the dynamic identity proofing system 300 in front of one or more computing devices such that any external devices may communicate directly with the specialized hardware.

Figure 4:
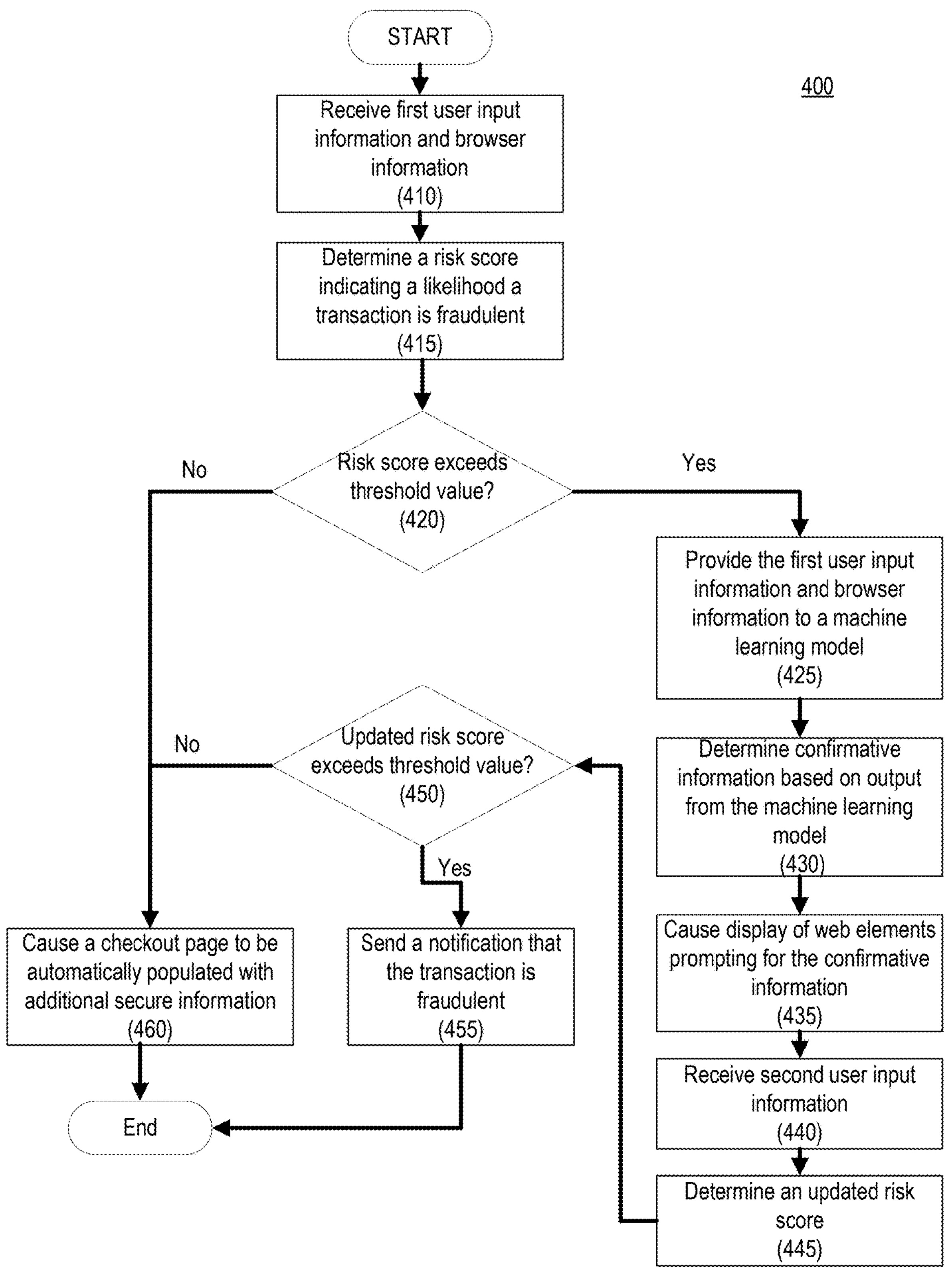
FIG. 4 shows a flow chart of a process for dynamic identity proofing according to one or more aspects of the disclosure.

The dynamic identity proofing systems may collect and process user interaction information and browser information to determine confirmative information to be displayed on a user device for dynamic identity proofing. As such, the user interaction information and browser information may be used to support enhanced security and optimal user experience. FIG. 4 shows a flow chart of a process for dynamic identity proofing according to one or more aspects of the disclosure. Some or all of the steps of process 400 may be performed using one or more computing devices as described herein.

Figure 5A:
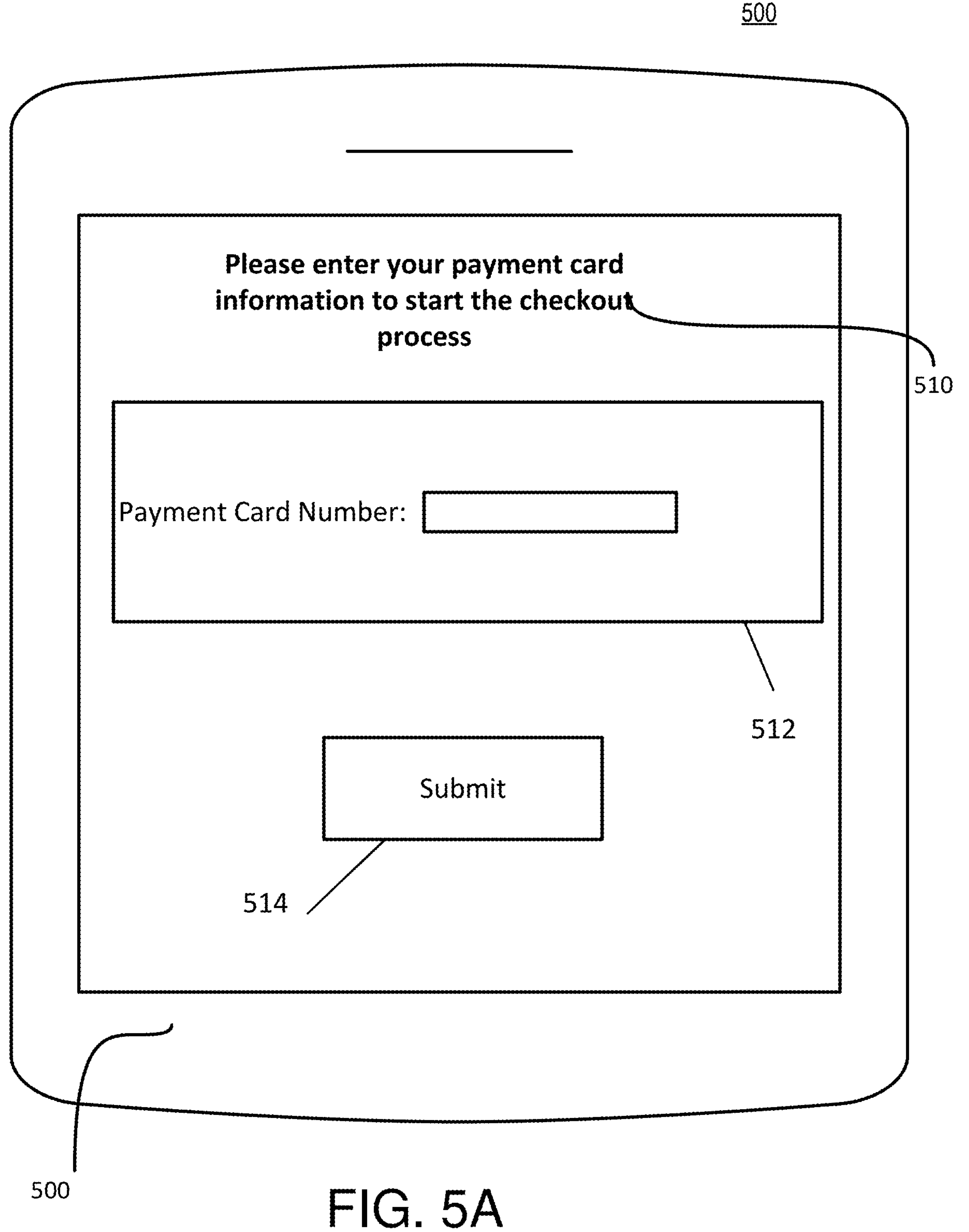
FIG. 5A shows a user interface displaying elements for dynamic identity proofing according to one or more aspects of the disclosure.

At step 410, a dynamic identity proofing server (e.g., dynamic identity proofing server 340) may receive first user input information and browser information associated with a user device conducting a transaction with an interaction entity (e.g., a merchant) via the checkout page. For example, a user may intend to purchase a product on the website and arrive at a checkout page as a guest user. FIG. 5A-5D illustrate examples user interfaces for dynamic identity proofing according to one or more aspects of the disclosure. The elements in FIGS. 5A-5D may be representations of various steps in method 400 depicted in FIG. 4. As illustrated in FIG. 5A, the user device may execute a browser window displaying a checkout page in user interface 510. The checkout page may prompt the user to enter an identifier of a payment card in field 512, such as a credit card number or a debit card number. The user may enter the credit card information and hit the submit button 514. After the user submission, the dynamic identity proofing server may receive the first user input information including the credit card number, and the browser information including an address of the user device. In some examples, the checkout page may also prompt the user to enter a card verification code (CVC) or an expiration date associated with the credit card number (not shown in FIG. 5A). If the user already has an account with the interaction entity, the user may login to her account and enter an account identifier to field 512 on the checkout page (not shown in FIG. 5A). For this account holder, the first user input information may include the account identifier, and the browser information may include an address of the user device. The dynamic identify proofing mechanism may be particularly useful for transactions conducted by guest users, given that it might be challenging to verify their identities based on limited information such as the credit card number.

The dynamic identity proofing server may receive interaction information (e.g., first user input information) and browser information from a browser extension or other mechanisms installed on a user device as user navigates to the checkout page. The other mechanisms installed on the user device may include APIs, cookies, front end or server end code, integrations with CMS, applications on ecommerce platforms, and the like. For example, the browser extension or other mechanisms may monitor user interaction with a website as the user opens the website identified by a Universal Resource Link (URL). The user may perform various operations on the website to interact with elements of the website. For example, the user may move the cursor to certain products displayed on the website. The browser extension or other mechanisms may collect user interaction information indicating how much time that the user spent looking at a particular product, whether the user added the product to a cart, whether the user navigates to the checkout page, whether the user inputs information to any field of the checkout page, whether the user attempts to checkout as a guest user or as an account holder associated with the website. The browser extension or other mechanisms may collect user interaction information including navigation history such as whether the user visited the website in the past, the websites that the user visited prior to arriving at the website, or the type of the prior websites (e.g., a paid website, a social network website, websites providing similar products being purchased, a dark web) before the user arrived at the website. The browser extension or other mechanisms may collect user interaction information including search terms that the user used on the website or other websites. The browser extension or other mechanisms may collect user interaction information including user attributes such as a location, an IP address, a gender or an age of the user. The browser extension or other mechanisms may collect device information such as an IP address, a make or a model of the user device, and a type of browser displaying the checkout page on the user device. The browser extension or other mechanisms may collect transaction information related to the product or service being purchased, such as a timestamp, a price or a product associated with the transaction. The browser extension or other mechanisms may collect entity information, such as an entity name of the interaction entity, an MCC of the interaction entity, or a product or service provided by the interaction entity. The browser extension or other mechanisms may send the collected user interaction information and the browser information to the dynamic identity proofing server.

Alternatively and/or additionally, the dynamic identity proofing server may receive the first user input and the browser information from the interaction entity device. For example, the interaction entity device may collect the first user input and the browser information on its website and send the information to dynamic identity proofing server via pre-authentication message according to ISO 20022 format. The pre-authentication message may use XML schema to support robust data exchange between the interaction entity and the dynamic identity proofing server.

In some examples, the dynamic identity proofing server may receive the first user input and the browser information as unstructured data format, such as a string of characters in a text format. The string of characters may be converted into a common format, such as a JSON format or an XML format. The dynamic identity proofing server may receive and process the user input information and the browser information in a data stream on the fly. The dynamic identity proofing server may receive and process the user input information and the browser information in batch manner. For example, the user interaction information may be received periodically, such as once per minute or once per 10 seconds. The user interaction information in the text format may be pre-processed, perform a random sampling to take chunks of text to look for similarities among different batches to eliminate duplicated data. The user interaction information may be generated after a verification of non-duplicated data to produce a light weight data payload.

At step 415, based on the user input information and the browser information, the dynamic identity proofing server may determine a risk score indicating a likelihood that the transaction is fraudulent. In one example, after the user enters the credit card number, the dynamic identity proofing server may retrieve relevant information associated with the credit card from a user database or transaction database such as an account identifier, a name of the user, a home address, a phone number and an email address associated with the credit card number. The dynamic identity proofing server may further receive the browse information including an IP address of the user device. The dynamic identity proofing server may determine that IP address indicating that the user device is located thousand miles from the home address associated with the credit card. In this situation, the dynamic identity proofing server may determine that there is an elevated risk associated with the transaction, and assign a relative higher risk score indicating that the transaction might be fraudulent. In another example, if the transaction is originated from a user who successfully logged in to the website to purchase groceries following his routine every Saturday. The dynamic identity proofing server may further determine that an IP address of the user matches with the home address of the user. In this situation, the dynamic identity proofing server may determine that there is a low risk associated with the transaction, and assign a relative lower risk score indicating that the transaction is trustworthy.

The dynamic identity proofing server may use a first machine learning model to determine the risk score. For example, the dynamic identity proofing server may provide the credit card number, the browser information including the IP address of the user device, as input to the first machine learning model. Based on output from the first machine learning model, the dynamic identity proofing server may determine the risk score associated with the transaction. The first machine learning model may be trained using training data across various websites and different users. The first machine learning model may be a supervised machine learning model and may be trained based on user feedback. The trained first leaning model may identify a pattern of user interactions and browser information that may indicate a likelihood that the transaction is fraudulent. The dynamic identity proofing server may determine the likelihood in real time while the user is interacting with the website.

Optionally, instead of using the first machine learning to determine the risk score, the dynamic identity proofing server may use a rule-based mechanism based on user interaction and browser information. For example, if a guest user provides the credit card number attempting to make a purchase at 2 AM from a new website that the card has never conducted any transactions in the past, the dynamic identity proofing server may determine that there is a risk that the card is being compromised by an imposter and assign a relative higher risk score to the transaction.

At step 420, the dynamic identity proofing server may determine whether the risk score for the transaction exceeds a threshold value. The dynamic identity proofing server may compare the risk score with a predetermined value (e.g., 85%). If the risk score does not exceed the threshold value, indicating that the transaction is trustworthy, the process may proceed to step 460, where the dynamic identity proofing server may cause the checkout page to be automatically populated with additional secure information. The additional secure information may include at least one of a billing address, a shipping address, an email address, a phone number, or a name associated with a user of the user device. The dynamic identity proofing server may retrieve, from a database and based on the identifier of the payment card, the additional secure information associated with the user device and corresponding to one or more unfilled web elements of the checkout page. The dynamic identity proofing server may send the additional secure information to the user device or the interaction entity device to cause the user device to automatically populate the unfilled fields on the checkout page. In the example that the transaction is originated from a user who successfully logged in to the website to purchase groceries following his routine every Saturday, given that the risk score does not exceed the threshold value, the dynamic identity proofing server may determine that the transaction is trustworthy and allow the transaction to proceed.

Figure 5B:
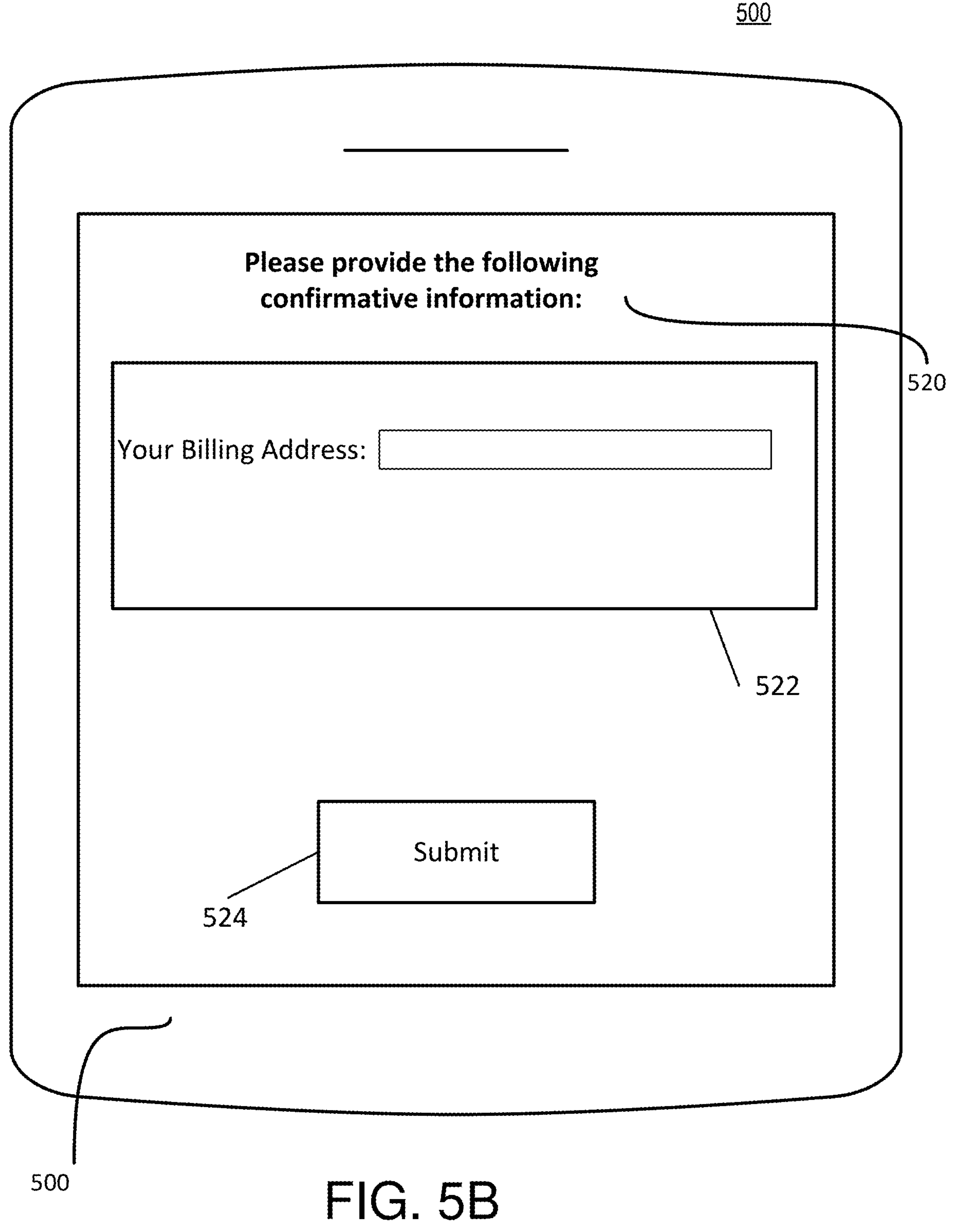
FIG. 5B shows a user interface displaying elements for dynamic identity proofing according to one or more aspects of the disclosure.
Figure 5C:
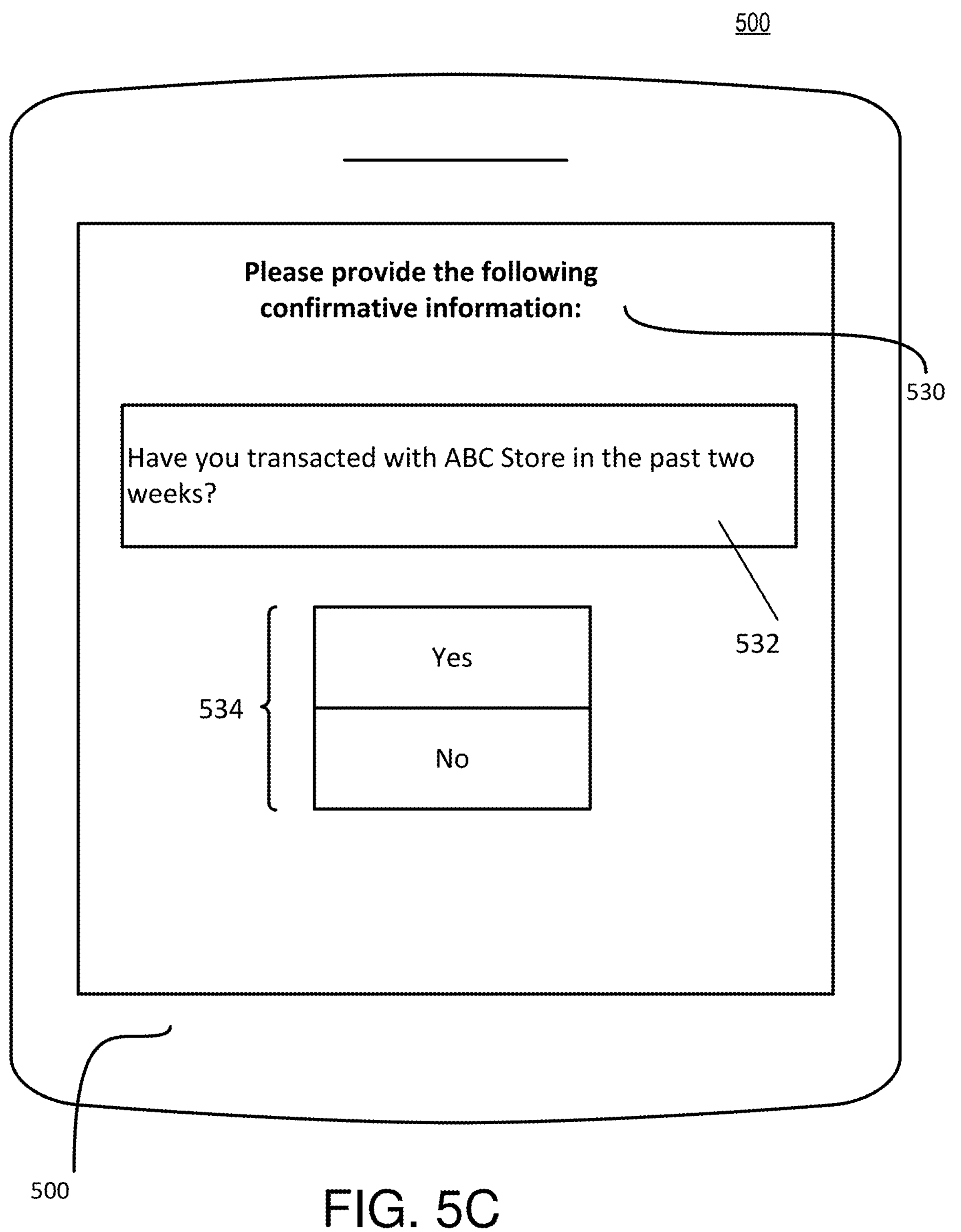
FIG. 5C shows a user interface displaying elements for dynamic identity proofing according to one or more aspects of the disclosure.
Figure 5D:
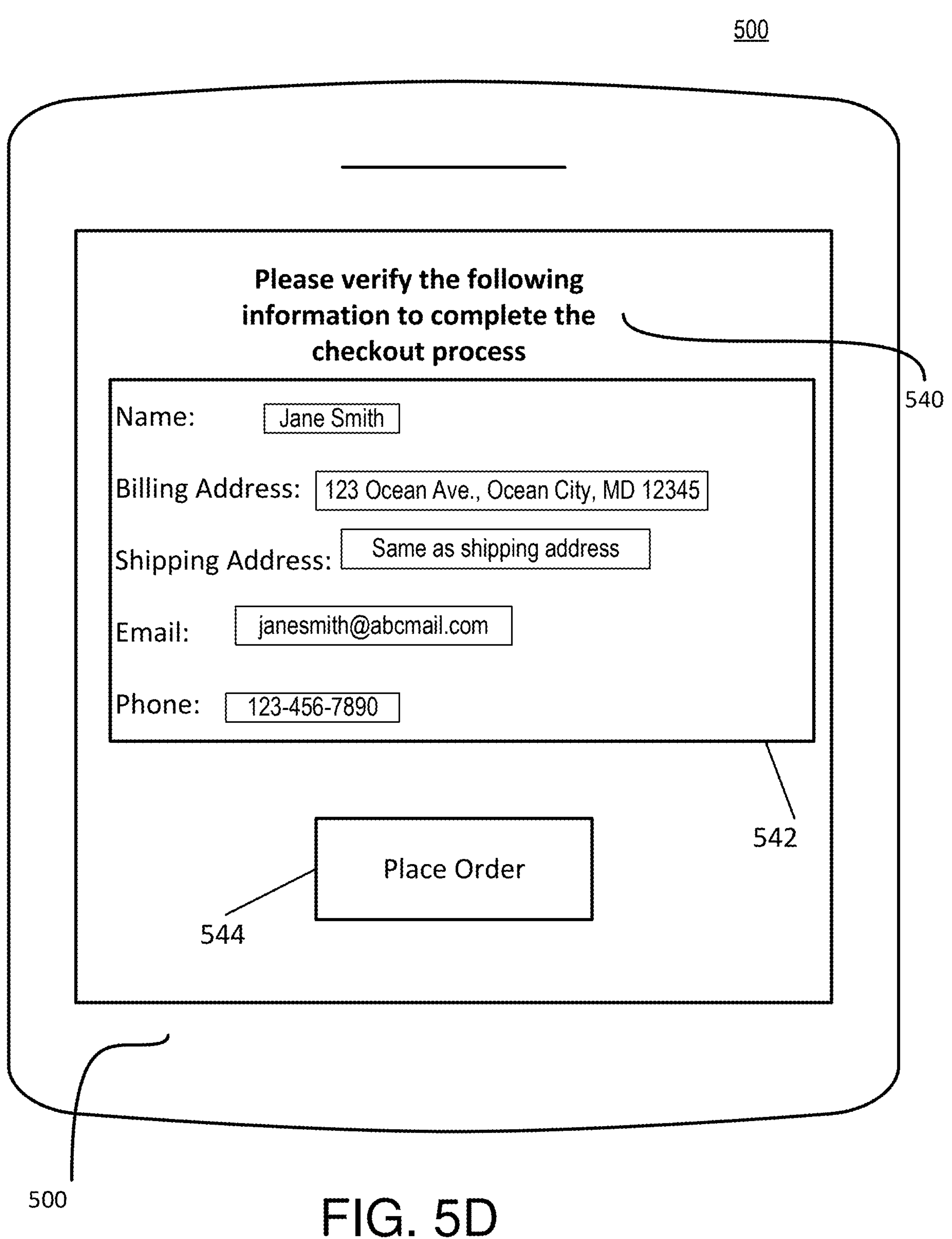
FIG. 5D shows a user interface displaying elements for dynamic identity proofing according to one or more aspects of the disclosure.

FIG. 5D shows another user interface displaying the elements for dynamic identity proofing according to one or more aspects of the disclosure. As illustrated in FIG. 5D, the dynamic identity proofing server may retrieve the additional secure information including the name of the card holder, the billing address, the shipping address, the email address and the phone number from the database. The dynamic identity proofing server may cause the unfilled fields 524 on the checkout page to be automatically populated with the additional secure information. The checkout page may display a message 540 "please verify the following information to complete the checkout process." After the verification, the user may hit the button 544 to place the order and complete the checkout process.

If the risk score exceeds the threshold value, the process may proceed to step 425, where the dynamic identity proofing server may provide known characteristics of the user device conducting the transaction as input to a second machine learning model. The known characteristics may include the risk score, the first user input information and the browser information. The first user input information may include the credit card number. The browser information may further include device information such as an IP address of the user device, a type of browser that the user device displays the checkout page, and a make or a model of the user device. The browser information may further include transaction information such as a timestamp, a price and one or more products associated with the transaction. The browser information may further include entity information such as an entity name associated with the entity, a merchant category code (MCC) associated with the entity and a product or service provided by the entity.

At step 430, the dynamic identity proofing server may use the second machine learning model to determine confirmative information to be requested from the user to further verify the user's identity and lower the risk of the transaction. The confirmative information may include at least one of a billing address, a shipping address, an email address, a phone number, or a name associated with a user of the user device. The confirmative information may also include questions generated based on the user's past transaction history. The second machine leaning model may identify confirmative information that may not be easily guessed based on the known characteristics of the user device or the user. For example, if the browser information indicates that the IP address of the user device does not match with the home address of the user, the second machine learning model may output the home address as the confirmative information to be requested from the user. If the browser information indicates that the transaction is conducting at 2 AM from a website unfamiliar to the user and with a large transaction amount untypical to the spending pattern of the user, the second machine learning model may output a security question based on the user's past transaction history as the confirmative information to be requested from the user. For example, the security question may ask whether the user conducted any transaction with ABC Store in the past two weeks, so that even an imposter has access to the user's credit card information, he might not be able to answer the security question without knowing the detailed transaction history of the user.

The second machine learning model may be trained using training data across various websites and different users. The second machine learning model may be a supervised machine learning model and may be trained based on user feedback. The machine learning model may be trained based on training data retrieved from a training database or a transaction database. The training data may include prelabeled risk scores for training transactions, device information associated with training user devices conducting the training transactions, transaction information associated with one or more products in the training transactions, and merchant information associated with the training transactions. For example, the merchant information may include an entity name and an MCC associated with the merchant. The training data may include information related to user interactions with the training websites. The user interaction information may indicate a pattern of user actions that may reflect fraudulent or non-fraudulent transactions. For example, the training data may include information indicating whether a training user adds the one or more products into a cart on the training website, information indicating prior websites that the training user visited before arriving at the training website, or information indicating whether the training user visited the training website in the past. The training data may include search terms used by the training user on the training website, or search results presented to the training user on the training website. The training data may include a location of the training user, an IP address of the training user device and a timestamp for the transaction conducted by the user.

During the model training process, the weights of each connection and/or node may be adjusted as the model adapts to generate more accurate predictions on a training set. The weights assigned to each connection and/or node may be referred to as the model parameters. For example, the dynamic identity proofing server may use a deep learning model and the model may be initialized with a first set of model parameters. The machine learning model may use the training data as input based on the first set of model parameter and determine the confirmative information with a first confidence level. The dynamic identity proofing server may generate a second set of model parameters based on the adjustment on the first set of model parameters. The second machine learning model may use the training data as input based on the second set of model parameter and determine the confirmative information with a second confidence level. Based on a comparison between the first confidence level and the second confidence level, dynamic identity proofing server may determine a more optimal set of parameters between the first set of model parameters and the second set of model parameters. The dynamic identity proofing server may go through several iterations, and the machine learning model may be tuned with a set of optimal model parameters when the confidence level reaches a predetermined threshold (e.g., 95%).

The dynamic identity proofing server may use the tuned or trained second machine learning model to determine the confirmative information. Based on the user interaction information and browser information, the dynamic identity proofing server may receive, as output from the trained second machine learning model, the confirmative information to be requested from the user.

At step 435, the dynamic identity proofing server may cause display of one or more web elements on the checkout page prompting for the confirmative information. FIGS. 5B-5C show additional user interfaces displaying the elements for dynamic identity proofing according to one or more aspects of the disclosure. The dynamic identity proofing server may request different confirmative information from different users. In the example of FIG. 5B, the user interface 500 displays a message 520 "please provide the following confirmative information" to the user. The user is prompted to enter a billing address in field 522 and submit the response (e.g., the second user input) via submit button 524 on the checkout page. FIG. 5B may correspond to the example that the browser information indicates that the IP address of the user device does not match with the home address of the user, the dynamic identity proofing server may request the home address as the confirmative information from the user. In the example of FIG. 5C, the user interface 500 displays a similar message 530 "please provide the following confirmative information." The user is prompted to answer a security question in field 532 on the checkout page "have you transacted with ABC Store in the past two weeks?" The user may select "yes" or "no" in field 534 of the checkout page. FIG. 5C may correspond to the example where the browser information indicates that the transaction is conducting at 2 AM from a website unfamiliar to the user and with a large transaction amount untypical to the spending pattern of the user, the dynamic identify proofing server may use a security question based on the user's past transaction history as the confirmative information to be requested from the user. Using transaction-based question may enhance the security of the system, given that "ABC Store" in the surety question may not be relevant to the interaction entity in the current transaction, and an imposter might not be able to guess the answer to the security question based on the information of the current transaction.

At step 440, the dynamic identity proofing server may receive a second user input from the user device. The second user input may include the user's response to the confirmative information. For example, the user may input the billing address on the checkout page or select an answer "no" to the security question "have you transacted with ABC Store in the past two weeks."

At step 445, the dynamic identity proofing server may determine an updated risk score associated with the transaction based on the second user input. For example, the dynamic identity proofing server may provide the first user input, the second user input and the browser information as input to the second machine learning model. The dynamic identity proofing server may receive an updated risk score associated with the transaction as an output from the second machine learning model.

At step 450, the dynamic identity proofing server may determine whether the updated risk score exceeds the threshold value. If the updated risk score does not exceed the threshold value, the process may proceed to step 460, where the dynamic identity proofing server may cause the checkout page to be automatically populated with the additional secure information associated with the user device.

In some examples, if the updated risk score still exceeds the threshold value, the process may proceed to step 455, where the dynamic identity proofing server may send a notification to the interaction entity server that the transaction might be fraudulent and the transaction may be terminated. In other examples, if the updated risk score still exceeds the threshold value, the dynamic identity proofing server may use the second machine learning model to determine further confirmative information to be requested from the user, cause the further confirmative information to be displayed and receive response from user as third user input information. The dynamic identity proofing server may go through several iterations, until the continuously updated risk score does not exceed the threshold value and the unfilled fields on the checkout page have been populated automatically. In still other examples, the dynamic identity proofing server may set a limit on how many iterations are allowed before the transaction is rejected. For example, the user may be given three opportunities to provide confirmative information. If the user fails to provide valid confirmative information to lower the risk score below the threshold value after three attempts, the transaction will be rejected.

The dynamic identity proofing server may train the second the machine learning model continuously based on user input information. During the model training process, the model parameters may be tuned similarly to training process discussed above. The dynamic identity proofing server may use the tuned or trained second machine learning model to determine the confirmative information in real time. In some examples, the checkout page may be built dynamically based on the confirmative information requested from the user and the user's responses. For example, as the user inputs the confirmative information to certain fields, the checkout page may dynamically display additional fields requesting further confirmative information until the risk score falls below the threshold value. At this point, the remaining fields of the checkout page would be populated automatically and the transaction will be allowed to proceed.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method comprising:

monitoring, by a computing device and via an application programming interface (API), user interaction with web elements on a guest checkout page on a website associated with an entity, wherein the guest checkout page comprises, prior to receiving first user input information, a plurality of predetermined fields to be filled by a user comprising a first field and one or more second fields, and wherein the user does not have a pre-existing account with the entity hosted by the website;

receiving, by the computing device and from the guest checkout page, the first user input information and browser information associated with a user device conducting a transaction with the entity via the guest checkout page, wherein the first user input information comprises an identifier of a payment card in the first field of the plurality of predetermined fields, and wherein the browser information comprises an address of the user device;

determining a risk score indicating a likelihood the transaction is fraudulent;

based on the risk score exceeding a threshold value, providing, as input to a machine learning model, the risk score, the first user input information and the browser information;

receiving, as output from the machine learning model, a dynamic selection of a second field, from the one or more second fields of the plurality of predetermined fields, to prompt for confirmative information;

causing, by the computing device and on the user device, dynamically loading the second field on the guest checkout page prompting for the confirmative information;

receiving, by the computing device and from the user device, second user input information populating the second field;

determining, based on the second user input information, an updated risk score associated with the transaction;

based on the updated risk score exceeding the threshold value:

dynamically selecting, as output from the machine learning model, a third field, from the plurality of predetermined fields, to prompt for the confirmative information; and causing, by the computing device and on a user interface of the user device, display of the third field on the guest checkout page; and based on the updated risk score not exceeding the threshold value, causing, by the computing device and on the user interface, display of the first field populated with the first user input information, the second field populated with the second user input information, and one or more remaining fields, of the plurality of predetermined fields, on the guest checkout page, wherein the one or more remaining fields are automatically populated with additional secure information associated with the user device.

2. The computer-implemented method of claim 1, further comprising:

prior to populating the one or more remaining fields on the guest checkout page to be automatically populated, retrieving, based on the identifier of the payment card, by the computing device and from a database, the additional secure information associated with the user device and corresponding to the one or more remaining fields of the guest checkout page.

3. The computer-implemented method of claim 1, wherein the confirmative information or the additional secure information comprises at least one of:

a billing address, a shipping address, an email address, a phone number, or a name associated with a user of the user device.

4. The computer-implemented method of claim 1, wherein determining the risk score comprises:

providing, as input to a second machine learning model, the first user input information and the browser information; and determining, based on output from the second machine learning model, the risk score.

5. The computer-implemented method of claim 1, wherein the browser information further comprises device information comprising:

an IP address of the user device;

a type of browser that the user device displays the guest checkout page; and a make or a model of the user device.

6. The computer-implemented method of claim 1, wherein the browser information further comprises transaction information comprising:

a timestamp associated with the transaction;

a price associated with the transaction; and one or more products associated with the transaction.

7. The computer-implemented method of claim 1, wherein the browser information further comprise entity information comprises:

an entity name associated with the entity;

a merchant category code (MCC) associated with the entity; and a product or service provided by the entity.

8. The computer-implemented method of claim 1, further comprising:

training the machine learning model to determine the confirmative information based on training data comprising:

pre-labeled risk scores for training transactions;

device information associated with training user devices conducting the training transactions;

transaction information associated with one or more products in the training transactions; and merchant information associated with the training transactions.

9. The method of claim 1, wherein the machine learning model outputs a first type of confirmative action based on a first risk score, and the machine learning model outputs a second type of confirmative action based on a second risk scores, wherein the first risk score is higher than the second risk score.

10. The method of claim 9, wherein causing dynamically loading the one or more second fields comprises:

causing display of a first set of fields based on the first type of confirmative action; and causing display of a second set of fields based on the second type of confirmative action.

11. An electronic data processing system comprising:

one or more processors; and memory storing instructions that, when executed by the one or more processors, cause the electronic data processing system to:

monitor, via an application programming interface (API), user interaction with web elements on a guest checkout page on a website associated with an entity, wherein the guest checkout page comprises, prior to receiving first user input information, a plurality of predetermined fields to be filled by a user comprising a first field and one or more second fields, and wherein the user does not have a pre-existing account with the entity hosted by the website;

receive, from the guest checkout page, the first user input information and browser information associated with a user device conducting a transaction with the entity via the guest checkout page, wherein the first user input information comprises an identifier of a payment card in the first field of the plurality of predetermined fields, and wherein the browser information comprises an address of the user device;

determining a risk score indicating a likelihood the transaction is fraudulent;

based on the risk score exceeding a threshold value, provide, as input to a machine learning model, the risk score, the first user input information and the browser information;

receive, as output from the machine learning model, a dynamic selection of a second field, from the one or more second fields of the plurality of predetermined fields, to prompt for confirmative information;

cause, on the user device, dynamically loading the second field on the guest checkout page prompting for the confirmative information;

receive, from the user device, second user input information populating the second field;

determine, based on the second user input information, an updated risk score associated with the transaction;

retrieve, based on the identifier of the payment card and from a database, additional secure information associated with the user device and corresponding to one or more unfilled web elements of the guest checkout page;

based on the updated risk score exceeding the threshold value:

dynamically selecting, as output from the machine learning model, a third field, from the plurality of predetermined fields, to prompt for the confirmative information; and causing, on a user interface of the user device, display of the third field on the guest checkout page; and based on the updated risk score not exceeding the threshold value, cause, on the user interface, display of the first field populated with the first user input information, the second field populated with the second user input information, and one or more remaining fields, of the plurality of predetermined fields, on the guest checkout page, wherein the one or more remaining fields are automatically populated with the additional secure information associated with the user device.

12. The electronic data processing system of claim 11, wherein the confirmative information or the additional secure information comprises comprise at least one of:

a billing address, a shipping address, an email address, a phone number, or a name associated with a user of the user device.

13. The electronic data processing system of claim 11, wherein the instructions, when executed by the one or more processors, cause the electronic data processing system to determine the risk score by:

providing, as input to a second machine learning model, the first user input information and the browser information; and determining, based on output from the second machine learning model, the risk score.

14. The electronic data processing system of claim 11, wherein the browser information further comprises device information comprising:

an IP address of the user device;

a type of browser that the user device displays the guest checkout page; and a make or a model of the user device.

15. The electronic data processing system of claim 11, wherein the browser information further comprises transaction information comprising:

a timestamp associated with the transaction;

a price associated with the transaction; and one or more products associated with the transaction.

16. The electronic data processing system of claim 11, wherein the browser information further comprises entity information comprises:

an entity name associated with the entity;

a merchant category code (MCC) associated with the entity; and a product or service provided by the entity.

17. The electronic data processing system of claim 11, wherein the instructions, when executed by the one or more processors, cause the electronic data processing system to:

train the machine learning model to determine risk scores based on training data comprising:

pre-labeled risk scores for training transactions;

device information associated with training user devices conducting the training transactions;

transaction information associated with one or more products in the training transactions; and merchant information associated with the training transactions.

18. One or more non-transitory computer-readable media storing instructions that, when executed by one or more processors, cause a computing device to:

monitor, via an application programming interface (API), user interaction with web elements on a guest checkout page on a website associated with an entity, wherein the guest checkout page comprises, prior to receiving first user input information, a plurality of predetermined fields to be filled by a user comprising a first field and one or more second fields, and wherein the user does not have a pre-existing account with the entity hosted by the website;

receive, from the guest checkout page, the first user input information and browser information associated with a user device conducting a transaction with the entity via the guest checkout page, wherein the first user input information comprises an identifier of a payment card in the first field of the plurality of predetermined fields, and wherein the browser information comprises an address of the user device;

provide, as input to a first machine learning model, the first user input information and the browser information;

receive, as output from the first machine learning model, a risk score indicating a likelihood the transaction is fraudulent;

based on the risk score exceeding a threshold value, provide, as input to a second machine learning model, the risk score, the first user input information and the browser information;

receive, as output from the second machine learning model, a dynamic selection of a second field, from the one or more second fields of the plurality of predetermined fields, to prompt for confirmative information;

cause, on the user device, dynamically loading the second field on the guest checkout page prompting for the confirmative information;

receive, from the user device, second user input information populating the second field;

determine, based on the second user input information, an updated risk score associated with the transaction;

based on the updated risk score exceeding the threshold value:

dynamically selecting, as output from the second machine learning model, a third field, from the plurality of predetermined fields, to prompt for the confirmative information; and causing, by the computing device and on a user interface of the user device, display of the third field on the guest checkout page; and based on the updated risk score not exceeding the threshold value, cause on the user interface, display of the first field populated with the first user input information, the second field populated with the second user input information, and one or more remaining fields, of the plurality of predetermined fields, on the guest checkout page, wherein the one or more remaining fields are automatically populated with additional secure information associated with the user device.

19. The computer-readable media of claim 18, wherein the instructions, when executed by the one or more processors, cause the computing device to:

prior to automatically populating the one or more remaining fields, retrieve, based on the identifier of the payment card, by the computing device and from a database, the additional secure information associated with the user device and corresponding to the one or more remaining fields of the guest checkout page.

20. The computer-readable media of claim 18, wherein the instructions, when executed by the one or more processors, cause the computing device to:

train the second machine learning model to determine the confirmative information based on training data comprising:

pre-labeled risk scores for training transactions;

device information associated with training user devices conducting the training transactions;

transaction information associated with one or more products in the training transactions; and merchant information associated with the training transactions.

* * * * *